United States Patent [19]
Takeuchi et al.

[11] Patent Number: 4,542,079
[45] Date of Patent: Sep. 17, 1985

[54] FUEL CELL

[75] Inventors: Masato Takeuchi, Katsuta; Hiroshi Tobita, Kitaibaraki; Sigeru Okabe, Hitachi; Hideo Okada, Hitachi; Munehiko Tonami, Hitachi, all of Japan

[73] Assignee: Hitachi, Ltd., Tokyo, Japan

[21] Appl. No.: 681,247

[22] Filed: Dec. 13, 1984

Related U.S. Application Data

[63] Continuation of Ser. No. 461,217, Jan. 26, 1983, abandoned.

[30] Foreign Application Priority Data

Jan. 29, 1982 [JP] Japan .................................. 57-14015

[51] Int. Cl.⁴ .............................................. H01M 8/02
[52] U.S. Cl. ........................................ 429/39; 429/41
[58] Field of Search ................. 429/39, 40, 41, 44, 429/45, 46, 16

[56] References Cited

U.S. PATENT DOCUMENTS

| | | | |
|---|---|---|---|
| 3,505,120 | 4/1970 | Cole | 429/41 |
| 3,859,139 | 1/1975 | Dews et al. | 429/41 |
| 4,035,551 | 7/1977 | Grevstad | 429/41 |
| 4,216,278 | 8/1980 | Arendt et al. | 429/46 |
| 4,297,419 | 10/1981 | Nickols et al. | 429/46 |
| 4,329,403 | 5/1982 | Baker | 429/46 |
| 4,389,467 | 6/1983 | Singh et al. | 429/41 |

FOREIGN PATENT DOCUMENTS 87774 5/1983 Japan .................................. 429/44

Primary Examiner—Donald L. Walton
Attorney, Agent, or Firm—Antonelli, Terry & Wands

[57] ABSTRACT

A fuel cell comprising a pair of electrodes and an electrolyte body comprising an electrolyte-retainable material and an electrolyte retained in the electrolyte-retainable material, the electrolyte body being provided between the pair of electrodes, characterized by the electrolyte body being integrated with at least one of the pair of electrodes. The fuel cell has a good sealing between the electrodes and the electrolyte body.

14 Claims, 11 Drawing Figures

FUEL CELL

This is a continuation of application Ser. No. 461,217, filed Jan. 26, 1983, now abandoned.

BACKGROUND OF THE INVENTION

This invention relates to a fuel cell and more particularly to a fuel cell suitable for cells using molten carbonate as an electrolyte.

A fuel cell has an electrolyte body between a pair of electrodes, i.e. anode and cathode, and the electrolyte body comprises a porous electrolyte-retainable material and an electrolyte retained in the pores of the porous electrolyte-retainable material. A practical fuel cell comprises a plurality of unit cells stacked one upon another, and the conventional means of successively stacking anodes, electrolyte bodies, cathodes and cell frames as cell constituent members one upon another has the following problems:

(1) It is difficult to fabricate an electrolyte body with a good flatness, and is liable to have a curving or waving. Thus, stacking is hard to carry out. For example, when the cell constituent members are stacked one upon another and secured together by bolts, etc., the electrolyte bodies are cracked or damaged. A good contact cannot be obtained between the electrodes and the electrolyte bodies, or between the cell frames and the electrolyte bodies. When no good contact is obtained between the electrodes and the electrolyte bodies, a good three-phase boundary (field of electrode reaction formed in the presence of electrode catalyst, electrolyte solution and fuel or oxidizing agent) will be hard to maintain, resulting in lowering of cell performance. When no good contact is obtained between the cell frames and the electrolyte bodies, a wet sealing between the electrolyte bodies and the cell frames by an electrolyte solution (prevention of gas leakage) will be not satisfactory and it will be difficult to prevent a gas leakage from the wet sealing.

(2) The cell constituent members must be stacked one by one and thus the stacking work will be complicated and also will not always be satisfactory from the viewpoint of assembling precision. Careful stacking work is required for complete sealing of manifolds or for provision of a complete gas passage against a possible failure in alignment of the cell constituent members, and also for handling of each of the cell constituent members, particularly electrolyte body.

SUMMARY OF THE INVENTION

An object of the present invention is to overcome the foregoing problems and more particularly to provide a fuel cell having an improvement in sealing between electrodes and electrolyte body.

According to the present invention, at least one of a pair of electrodes, i.e. cathode and anode is integrated with an electrolyte body.

The present invention provides a fuel cell comprising at least a pair of electrodes of electron conductive catalytic refractory material and at least an electrolyte body comprising an electrolyte-retainable porous, refractory, non-electron conductive, inorganic material and an electrolyte retained in the electrolyte-retainable porous material, the electrolyte body being provided between the pair of the electrode, an oxidizing agent passage means for supplying an oxidizing agent to one of the electrodes, a fuel passage means for supplying a fuel gas to the other electrode, wherein the electrolyte body is integrated with at least one of the pair of the electrodes, or through an intermediary provided between at least one of the pair of the electrodes and the electrolyte body, or furthermore. the electrolyte body has a coating layer of constituent materials of the electrode on at least one surface of the electrolyte body, where the coating layer is a melt injection layer, or at least one of the pair of the electrodes and the electrolyte body or together with the intermediary are integrated by pressing with heating, or the intermediary is formed by coating the surface of the electrolyte body with a mixture of at least one of constituent materials of the electrode and the electrolyte-retainable material with the electrolyte material, where a coating layer of constituent materials of the electrode is provided on the intermediary, or the intermediary is a porous material, where at least one portion of constituent materials of the electrode and the electrolyte body is filled in pores of the porous material.

That is, an electrode and an electrolyte body can be integrated together by coating the surface of electrolyte body with electrode constituent materials by melt injection or application of the latter, or by placing an electrolyte body on an electrode, and pressing the electrolyte body and the electrode to such an extent as not to cause cracking the electrolyte body, while heating.

An electrode and an electrolyte body can be integrated together by providing an intermediary therebetween.

Operating temperature of a fuel cell of molten carbonate type is as high as 600°–700° C., and power generation is based on an electrochemical reaction using hydrogen as fuel and air as an oxidizing agent.

Fuel hydrogen must not leak out from the fuel cell absolutely. Even when an oxidizing agent leaks out from the fuel cell, the necessary pressure cannot be given to the full cell and the necessary amount of an oxidizing agent for the electrochemical reaction will be short. The leakage also leads to a safety problem.

If an electrolyte body is cracked, the oxidizing agent or fuel migrates through the electrolyte body, and they directly contact each other and cause mere combustion reaction other than the electrochemical reaction and generate heat. This also leads to a safety problem.

Thus, fuel cell constituent members must be carefully stacked one upon another, and thus it is indispensable to increase the mechanical strength of the respective fuel cell constituent members and to simplify the stacking work. These problems have been solved in the present invention.

Integration of electrode constituent materials with the electrolyte body by melt injection of the latter according to the present invention has the following effects.

The electrolyte-retainable material is usually made from ceramic materials and is very breakable and susceptible to the own weight or a securing load at the stacking. On the other hand, the electrolyte body integrated with the electrode constituent materials by melt injection of the latter onto the electrolyte body is in such a structure that the electrolyte body and the electrode are integrated in a tightly bonded state, and thus the strength of the electrolyte body is increased. That is, the electrolyte body is hardly breakable.

Since the electrolyte body is integrated with at least one of the pair of electrodes, the stacking work is reduced in working step number and the workability and its reliance, for example, control of constituent part number and inspection of alignments of the constituent members, can be greatly improved.

In the case of integration of electrolyte body with the electrode by pressing with heating, it is desirable that the heating temperature be below the melting point of the electrolyte solution. Otherwise, the electrolyte solution leaks out at the pressing, and sometimes it is necessary to separately supplement the electrolyte solution. The pressing means includes various pressing procedures, for example, plate pressing, roll pressing, mold pressing, etc. Roll pressing is one of the desirable pressing procedures, but any other appropriate procedure than the pressing procedure can be applied, if available.

Integration of an electrolyte body with an electrode through an intermediary is very desirable, where it is preferable to use a material capable of acting to reinforce the electrolyte body as the intermediary.

It is also desirable to integrally bond both anode and cathode to the electrolyte body, and thus it is desirable to provide intermediaries at both sides of the electrolyte body. The intermediary includes metal nettings, expanded metal, ceramic or metallic honeycomb structure, porous metal disclosed in Japanese Patent Publication No. 8698/81, etc.

When a honeycomb structure or the porous metal disclosed in Japanese Patent Publication No. 8698/81 is used, it is preferable to fill at least one portion of the electrode and at least one portion of the electrolyte body in the pores of the honeycomb structure or the porous metal. With this structure, the mechanical strength of the electrolyte body is improved, and also the species of fuel cell constituent members are basically reduced to only two species, that is, an electrolyte body integrated with an electrode and a cell frame, resulting in a great improvement in stacking workability. That is, the handling of fuel cell constituent members can be made easier owing to the improved mechanical strength, and also the stacking work can be simplified, improving the precision of assembling.

The intermediary can be provided on parts of the electrolyte body and the electrode, that is, on the surface parts thereof to reinforce both electrolyte body and electrode, or on the entire surfaces of the electrolyte body and the electrode to reinforce both of them.

The preferable intermediary is a ceramic or metallic honeycomb structure, or a three-dimensionally cross-linked netting structure disclosed in Japanese Patent Publication No. 8698/81. When the intermediary is provided on the entire surfaces of the electrolyte body and the electrode and when the intermediary is made of a metal, it is necessary to use an intermediary with a non-electroconductive property at least in its surface layer.

Various procedures are available for bonding an electrolyte body to an electrode through an intermediary. One of the procedures is to press at least one of anode and cathode and an electrolyte body, as provided through an intermediary therebetween, by a mold or rolls, preferably while heating them. The intermediary can be provided and retained at the electrode side or electrolyte body side in advance.

Another procedure is to coat the exposed side of an intermediary provided and retained at the electrolyte body side with an electrode catalyst by melt injection or application of the latter.

Other procedure is to insert into the honeycomb structure or the three-dimensionally cross-linked netting structure the electrode catalyst and the electrolyte body in independent layers.

Integration of the electrolyte body with the electrode can be obtained by forming indents, 0.3–1 mm deep, at least on one side or preferably on both sides of the electrolyte body and retaining the electrode catalyst in the indents, where it is also possible to provide an intermediary between the electrolyte body and the electrode.

The electrode catalyst can be retained by melt injection, application or casting thereof.

BRIEF DESCRIPTION OF THE DRAWINGS

FIG. 5 is a schematic view showing an integrated structure of an electrolyte body and an electrode, FIG. 6 is a schematic view of a melt injection mask, FIG. 7 is a cross-sectional view showing the state of the electrolyte body overlaid with the melt injection mask, FIG. 8 is a cross-sectional view of the resulting integrated structure, FIG. 9 is a plan view of a cell frame and FIG. 10 is a cross-sectional view of the cell frame along X—X of FIG. 9.

PREFERRED EMBODIMENTS OF THE INVENTION

Figure 1:
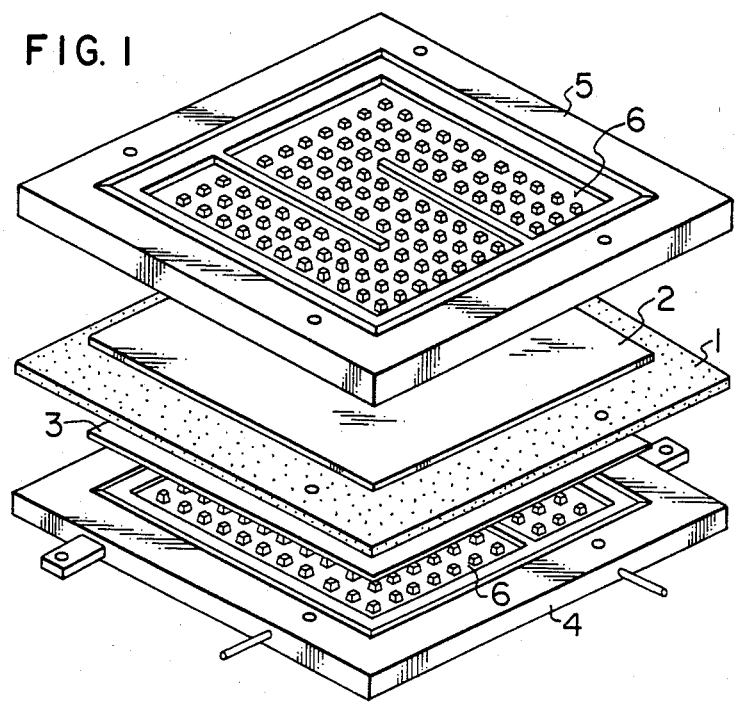
FIG. 1 is a schematic view showing the structure of a fuel cell of molten carbonate type.

In FIG. 1, a schematic view of a structure of a fuel cell of molten carbonate type is shown, where numeral 1 is an electrolyte body, comprising an electrolyte solution retained in the pores of a porous electrolyte-retainable material. A cathode 2 is provided on one surface of the electrolyte body 1, and an anode 3 on another surface thereof. Numerals 4 and 5 are cell frames, and a fuel compartment 6 is formed between the cell frame 4 and the anode 3, and an oxidizing agent compartment is formed between the cell frame 5 and the cathode 2.

In the present invention, the electrolyte body 1 is integrated with at least one of the cathode 2 and the anode 3.

The present invention will be described in detail below, referring to examples.

EXAMPLE 1

An electrolyte body (100 mm × 100 mm, and 1.5 mm thick) was provided between an anode and a cathode, each consisting of a porous sintered nickel plate (90 mm × 90 mm, and 0.9 mm thick) and the electrolyte body and the electrodes were integrated together by means of a plate press by pressing them at 520° C. under the pressure of 10 kg/cm$^2$. The electrolyte body had a structure of an alkali carbonate retained in a porous electrolyte-retainable material prepared by entangling lithium aluminate fibers. Unit cells were assembled from the electrolyte bodies integrated with the electrodes, and a gas mixture of 50% $H_2$ and 50% $N_2$ was led to the anode, and a gas mixture of 25% $O_2$, 25% $CO_2$ and 50% $N_2$ to the cathode to investigate a cell performance at 650° C. Cell voltage was 0.91 V at a current density of 50 mA/cm$^2$, 0.79 V at 100 mA/cm$^2$ and 0.68 V at 150 mA/cm$^2$.

EXAMPLE 2

Figure 2:
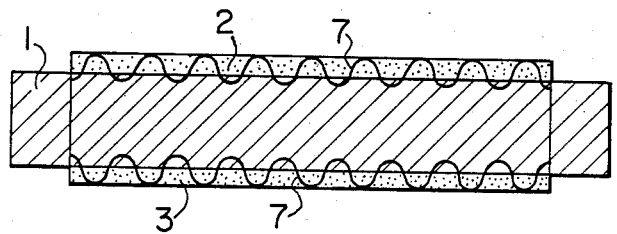
FIGS. 2–4 are cross-sectional views showing an integrated structure of an electrolyte body and an electrode according to the present invention.

An integrated structure of electrodes and electrolyte body shown in FIG. 2 was prepared. In this structure an electrolyte body 1 was provided between electrodes (anode and cathode) 2 and 3 and intermediaries 7 were provided between the electrodes and the electrolyte body with alternate crossing through the boundaries between the electrodes and the electrolyte body.

70 G of electrolyte body raw materials consisting of 50% by weight of lithium aluminate having an average particle size of 14 μm as an electrolyte-retainable material and 50% by weight of a mixed electrolyte of lithium carbonate and potassium carbonate at a molar ratio of the former to the latter of 62:38 was weighed out and press-shaped into a square form of 100 mm × 100 mm and 3 mm thick. The shaped article was dried at 60° C. for about 5 hours, and three-dimensionally cross-linked netting structures of lithiumized nickel (80 mm × 80 mm and 1 mm thick) each having 17–36 cells/inch (Cellmet, trademark of Sumitomo Denko K.K., Japan) were provided as intermediaries at both sides of the dried shaped article and fired at 490° C. for one hour, while lightly pressing the structures inwardly at both sides. The three-dimensionally cross-linked netting structures were embedded into the surface layer of electrolyte body 1 to a depth of about 0.4 mm. Then, they were cooled and a paste of nickel powder (as lithiumized) having an average particle size of 3 μm was applied to the exposed parts of the intermediaries 7 on the electrolyte body 1 to cover the exposed parts, dried and fired at about 450° C. to obtain an integrated structure of electrodes 2, electrolyte body 1 and intermediaries 7.

EXAMPLE 3

Figure 3:
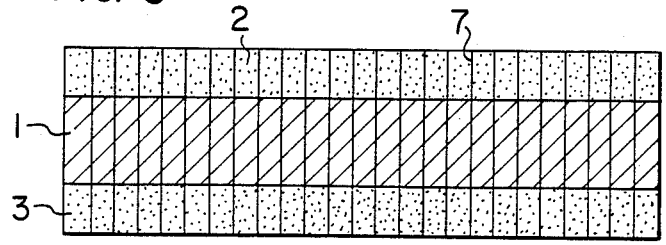

An integrated structure of electrodes and electrolyte body shown in FIG. 3 was prepared. The structure had a layer of electrolyte body 1 at the inside of an intermediary 7 and electrodes 2 and 3 at both sides of the layer.

A lithium aluminate honeycomb structure (100 mm × 100 mm, and 2 mm thick) having 36 cells/inch$^2$ and opening sizes each of 3.8 mm was used as the intermediary 7, and about 25 g of a paste of the same electrolyte body raw material as used in Example 2 was filled into the openings and dried. Then, 7.5 g each of the same electrode material nickel powder as used in Example 2 was provided at both sides of the electrolyte body raw material and pressed at 490° C. under total pressure of 500 kg for one hour to obtain the integrated structure of electrodes and electrolyte body.

EXAMPLE 4

Figure 4:
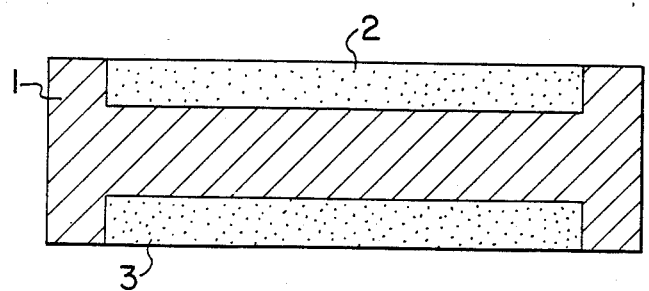

An integrated structure shown in FIG. 4 was prepared, where electrolyte body 1 was indented and raw materials of electrodes 2 and 3 were filled in the indents.

40 G of the same electrolyte body raw material as used in Example 2 was placed in a press mold having pusher patterns, each provided with a convex part (80 mm × 80 mm, and 0.5 mm high) in advance to make indents for the electrode area on the electrolyte body, and pressed under total pressure of 100 tons to obtain an electrolyte body (100 mm × 100 mm, and 2.0 mm thick at the indents and 3.0 mm thick at the peripheral part). The electrolyte body 1 was dried in a drier at 60° C. for 5 hours and then deareated and fired at 475° C. for one hour to an electrolyte body of paste type.

The same nickel powder paste as used in Example 2 was filled in the indents of the thus prepared paste type electrolyte body and fired in a reducing atmosphere at 700° C. for 30 minutes to obtain the integrated structure of electrodes and electrolyte body.

EXAMPLE 5

Figure 5:
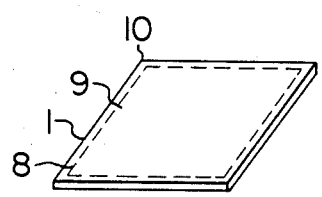
FIGS. 5–10 show steps of forming an electrode on the surface of an electrolyte body by melt injection, where

Electrode materials were provided onto an electrolyte body 1 by melt injection of the former as shown in FIG. 5. The area at the inside of dotted line 8 shows the electrode-melt injected surface 9 and the area at the outside of dotted line 8 shows a non-melt injected peripheral surface 10.

Figure 6:
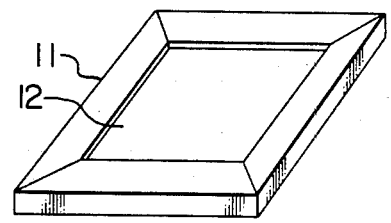
Figure 7:
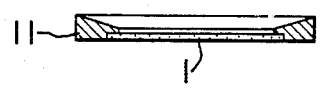
Figure 8:
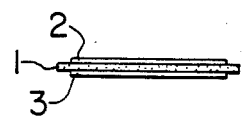

Melt injection was carried out in the following manner. A melt injection mask 11 shown in FIG. 6 was laid on the electrolyte body 1. The melt injection mask had a cutaway opening 12 having only a space corresponding to the effective area of an electrode to be formed. In FIG. 7, the state of electrolyte body 1 and melt injection mask 11 is shown in cross-section, and the electrode materials were melt injected onto both sides of electrolyte body 1 in this state. An integrated structure of electrolyte body and electrodes obtained by melt injecting the electrode materials to both sides of electrolyte body is shown in FIG. 8, where a cathode 2 and an anode 3 are formed on the electrolyte body 1 as a center.

Figure 9:
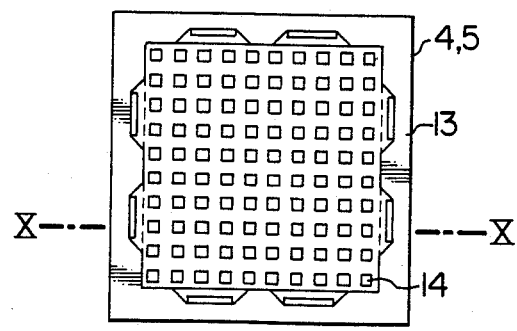
Figure 10:
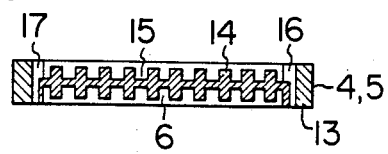

In FIG. 9, one embodiment of cell frames 4 and 5 is shown, where numeral 13 is a sealing part of cell frame and numeral 14 is current collector projections from the electrode. FIG. 10 is a cross-sectional view along the line X—X of FIG. 9, where numeral 15 is an oxidizing agent compartment adjacent to the cathode, numeral 16 is a passage at the inlet side for the oxidizing agent, and numeral 17 is a passage at the outlet side for the oxidizing agent.

Figure 11:
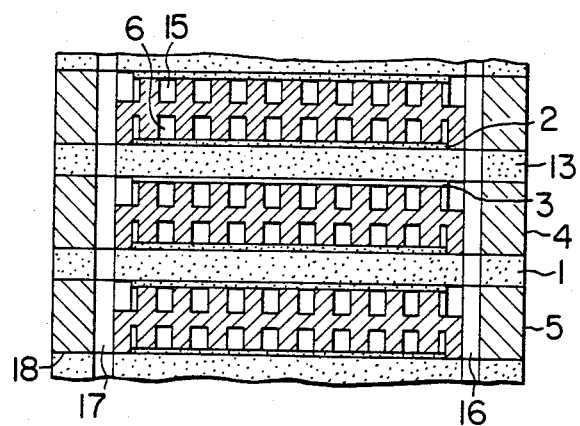
FIG. 11 is a cross-sectional view showing a state of a plurality of unit cells prepared according to the steps shown in FIGS. 5–10 and stacked one upon another.

The integrated structures of electrolyte body and electrodes obtained in any of the foregoing Examples and the cell frames shown in FIGS. 9 and 10 were stacked alternately one upon another to obtain a stacked structure shown in FIG. 11. A stacked fuel cell was assembled in this manner. Since the electrodes integrated with the electrolyte body can be precisely fitted into the oxidizing agent compartments 15 and the fuel compartments 16, there is no chance of malalignment and a stacking state can be checked by observing the contacting state between the sealing parts 13 of cell frame and the sealing parts 18 of electrolyte body.

What is claimed is:

1. A fuel cell comprising at least a pair of electrodes of electron conductive catalytic refractory material and at least an electrolyte body comprising an electrolyte-retainable porous, refractory, non-electron conductive, inorganic material and an electrolyte retained in the electrolyte-retainable porous material, the electrolyte body being provided between the pair of the electrodes, an oxidizing agent passage means for supplying an oxidizing agent to one of the electrodes, a fuel passage means for supplying a fuel gas to the other electrode, wherein an improvement comprises the electrolyte body being integrated with at least one of the pair of the electrodes through an intermediary provided between at least one of the pair of the electrodes and the electrolyte body, the intermediary being embedded in both the at least one of the electrodes and the electrolyte body.

2. The fuel cell according to claim 1, wherein the intermediary is formed by coating the surface of the electrolyte body with a mixture of at least one of constituent materials of the electrode and the electrolyte-retainable material with the electrolyte material.

3. The fuel cell according to claim 1, wherein a coating layer of constituent materials of the electrode is provided on the intermediary.

4. The fuel cell according to claim 3, wherein the coating layer is a melt injection layer.

5. The fuel cell according to claim 1, wherein the intermediary is a porous material.

6. The fuel cell according to claim 5, wherein at least one portion of constituent materials of the electrode and the electrolyte body is filled in pores of the porous material.

7. The fuel cell according to claim 1, wherein the intermediary and the electrode and the electrolyte body are integrated by pressing with heating.

8. The fuel cell according to claim 1, wherein the electrolyte is a molten carbonate electrolyte.

9. The fuel cell according to claim 1, wherein said intermediary is of a material that reinforces the electrolyte body.

10. The fuel cell according to claim 1, wherein said intermediary is made of a metal.

11. The fuel cell according to claim 1, wherein the intermediary has a structure of metallic netting, expanded metal, ceramic honeycomb, metallic honeycomb or porous metal.

12. The fuel cell according to claim 1, wherein the electrolyte body is integrated with both of the electrodes through the respective intermediaries provided between the electrodes and the electrolyte body.

13. The fuel cell according to claim 1, wherein said electrolyte body has indents on at least one side thereof, with the electrode on the at least one side being positioned in the indents with an intermediary between the electrolyte body and the electrode in the indents.

14. The fuel cell according to claim 12, wherein each of the intermediaries is embedded in both the electrolyte body and the respective electrode.

* * * * *